(12) United States Patent
Montecelo et al.

(10) Patent No.: US 12,372,813 B2
(45) Date of Patent: Jul. 29, 2025

(54) OPHTHALMIC LENS FOR IMPROVING NIGHT DRIVING VISION AND A METHOD FOR OBTAINING THE SAME

(71) Applicant: ESSILOR INTERNATIONAL, Charenton-le-Pont (FR)

(72) Inventors: Susana Montecelo, Charenton-le-Pont (FR); Marie Dubail, Charenton-le-Pont (FR); Céline Lechat, Charenton-le-Pont (FR); Céline Robin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 881 days.

(21) Appl. No.: 17/280,779

(22) PCT Filed: Sep. 23, 2019

(86) PCT No.: PCT/EP2019/075541
§ 371 (c)(1),
(2) Date: Mar. 26, 2021

(87) PCT Pub. No.: WO2020/064640
PCT Pub. Date: Apr. 2, 2020

(65) Prior Publication Data
US 2021/0325697 A1  Oct. 21, 2021

(30) Foreign Application Priority Data
Sep. 27, 2018 (EP) .................... 18306265

(51) Int. Cl.
*G02C 7/10* (2006.01)
*B29D 11/00* (2006.01)

(52) U.S. Cl.
CPC ........ *G02C 7/104* (2013.01); *B29D 11/00923* (2013.01)

(58) Field of Classification Search
None
See application file for complete search history.

(56) References Cited

U.S. PATENT DOCUMENTS 4,211,823 A   7/1980   Suzuki et al.
5,015,523 A   5/1991   Kawashima et al.
(Continued)

FOREIGN PATENT DOCUMENTS

EP   0 614 957   9/1994
EP   1 122 355   8/2001
(Continued)

OTHER PUBLICATIONS

International Search Report for PCT/EP2019/075541 dated Dec. 9, 2019, 4 pages.
(Continued)

*Primary Examiner* — William R Alexander
*Assistant Examiner* — Mackenzi Waddell
(74) *Attorney, Agent, or Firm* — NIXON & VANDERHYE

(57) ABSTRACT

This ophthalmic lens has a front face and a rear face, and has: a light cut factor CutLED of at least 20% for wavelengths ranging from 380 nm to 500 nm, CutLED being defined by:

$$CutLED = 100 - \frac{\sum_{\lambda=380}^{500} (\text{lens } T\% \times \text{LED emission }\%)}{\sum_{\lambda=380}^{500} \text{LED emission }\%}$$

where $\Sigma$ is a discrete or continuous sum operator, $\lambda$ is the wavelength in nm, lens T % is the transmittance of the
(Continued)

lens in % and LED emission % is the spectral distribution of a white light emitting diode in %; and an antireflective coating on the front and rear faces having a luminous reflectance in the visible region for scotopic vision Rv' lower than or equal to 1.5%.

20 Claims, 4 Drawing Sheets

(56) References Cited

U.S. PATENT DOCUMENTS

| | | | |
|---|---|---|---|
| 5,470,932 A | 11/1995 | Jinkerson | |
| 8,911,082 B2 | 12/2014 | Ambler | |
| 9,995,950 B2 * | 6/2018 | Kraus | G02C 7/104 |
| 10,481,413 B2 * | 11/2019 | Höfener | G02B 1/113 |
| 2014/0268031 A1 | 9/2014 | Ambler | |
| 2017/0219848 A1 | 8/2017 | Kraus et al. | |

FOREIGN PATENT DOCUMENTS

| | | | |
|---|---|---|---|
| EP | 1 237 035 | 9/2002 | |
| EP | 1 249 334 | 10/2002 | |
| EP | 1 298 483 | 4/2003 | |
| EP | 1 367 412 | 12/2003 | |
| EP | 1 388 607 | 2/2004 | |
| WO | 2007/147509 | 12/2007 | |
| WO | 2013/188825 | 12/2013 | |
| WO | WO-2013188825 A1 * | 12/2013 | A61F 2/16 |
| WO | WO-2016107916 A2 * | 7/2016 | C03C 17/3417 |
| WO | 2016/146153 | 9/2016 | |

OTHER PUBLICATIONS

Written Opinion of the ISA for PCT/EP2019/075541 dated Dec. 9, 2019, 8 pages.

Spanard, "LED Light Spectrum Enhancement with Transparent Pigmented Glazes", LED professional—LED Lighting Technology, Application Magazine, Jul. 6, 2016, <https://www.led-professional.com/resources-1/articles/led-light-spectrum-enhancement-with-transparent-pigmented-glazes-by-light-spectrum-glazes>, XP055571078, 12 pages.

Extended European Search Report for EP 18 30 6265 dated Mar. 22, 2019, 11 pages.

* cited by examiner

OPHTHALMIC LENS FOR IMPROVING NIGHT DRIVING VISION AND A METHOD FOR OBTAINING THE SAME

CROSS-REFERENCE TO RELATED APPLICATIONS

This application is the U.S. national phase of International Application No. PCT/EP2019/075541 filed Sep. 23, 2019 which designated the U.S. and claims priority to EP 18306265.2 filed Sep. 27, 2018, the entire contents of each of which are hereby incorporated by reference.

FIELD OF THE INVENTION

The present invention relates to an ophthalmic lens for improving night driving vision. The present invention also relates to a method for obtaining such an ophthalmic lens.

BACKGROUND OF THE INVENTION

When driving at night, glare is a key concern, especially glare caused to the driver by headlights of other cars and surrounding lights.

Most of the new car headlights use LED (Light-Emitting Diodes) sources, the emission of which contains a higher amount of short wavelengths and is more intense than other light sources such as former halogen lights.

By way of example, FIG. 1 shows the irradiance, in $\mu W/cm^2/nm$, of a LED headlight and of a halogen headlight as a function of the wavelength, in nm. The LED headlight has a short wavelength peak centered around 450 nm, while the halogen headlight increases smoothly in the whole visible wavelength range.

A high amount of short wavelengths can be responsible for glare.

Thus, there is a need to eliminate excess short wavelength light in order to prevent glare, without impairing night vision.

This amounts to achieving a suitable rejection level of short wavelengths of the visible spectrum coming from car headlights, while maintaining a high level of luminous transmittance Tv, which is defined in ISO 13666 standard as the ratio of the luminous flux transmitted by a lens to the incident luminous flux.

This should be achieved in two situations: on one hand, in front view, i.e. when a car with LED headlights that may cause glare is heading towards a driver wearing ophthalmic lenses, transmission of blue light from the LED headlights to the ophthalmic lenses of the driver should be attenuated and multiple reflections, which may cause ghost images and blur, should be avoided; and on the other hand, from behind, i.e. when the driver wearing ophthalmic lenses is followed by another car with LED headlights that may cause glare, blue light from the LED headlights should not be reflected, either by the rear face, or by the front face of the ophthalmic lenses of said driver.

Document U.S. Pat. No. 8,911,082 discloses an ophthalmic lens with two blocking filters positioned on its front face, having peak blocking wavelengths between 410 nm and 500 nm and between 530 nm and 620 nm.

However, such a lens will not prevent glare in the situation where the driver wearing the lens is followed by another car with LED headlights, because such LED light will go through the rear face until the front face of the lens and will then be reflected by the front face.

Besides, it is known that the sensitivity of human eyes is different when the luminance level decreases as compared to that under normal luminance levels, also known as photopic vision. Indeed, depending on the amplitude of illumination, the human eye is acting with different sensors, i.e. mainly with cones for day vision (high illuminations above 10 $cd/m^2$), whereas under lower luminance conditions, rod cells play an important role. The human eye is also more sensitive to glare in low illumination conditions or in the situation of night vision or scotopic vision.

The spectral luminous efficiency function for scotopic vision, which represents the spectral sensitivity of the eye for scotopic vision, is for instance well described in CIE in 1951 as $V'(\lambda)$.

The spectral sensitivity of the eye shifts towards shorter wavelengths in scotopic vision, as compared to photopic vision, as shown in FIG. 2.

Indeed, comparing the spectral luminous efficiency function for photopic vision $V(\lambda)$ as defined in CIE 1931 and the spectral luminous efficiency function for scotopic vision $V'(\lambda)$ as defined in CIE 1951, FIG. 2 shows that $V(\lambda)$ has a Gaussian shape with a peak value around 555 nm, whereas $V'(\lambda)$ also has a Gaussian shape and shows clear blue shift with a peak value around 507 nm.

Thus, $V(\lambda)$ is not accurate for scotopic vision. Indeed, in order to develop ophthalmic lenses dedicated to night driving, it is appropriate to take $V'(\lambda)$ into account, in order to guarantee the most adapted spectral and global transmission.

SUMMARY OF THE INVENTION

An object of the invention is to overcome the above-mentioned drawbacks of the prior art.

To that end, the invention provides an ophthalmic lens having a front face and a rear face, remarkable in that:
   it lowers by at least 20% transmission of light emitted by a LED for wavelengths ranging from 380 nm to 500 nm; and
   it has an antireflective coating on the front and rear faces having a luminous reflectance in the visible region for scotopic vision Rv' lower than or equal to 1.5%.

Therefore, the ophthalmic lens according to the invention has combined absorption and antireflective properties which make it possible both to reduce glare by rejecting (i.e. by absorption and/or reflection, yielding a lowered transmission of light) a moderate percentage of short wavelengths from LED sources arriving to the eye and to reduce ghost images by avoiding reflected light to come to the eye, in situations where the LED light is in front of the eye as well as situations where the LED light comes from behind.

Night driving vision is thus significantly improved.

The invention also provides a method for obtaining an ophthalmic lens as succinctly described above, remarkable in that it comprises a step of tinting the lens by applying a sublimation process or by applying a wet coating process or by applying an imbibition process or by mixing a light absorbing dye in a substrate composition.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
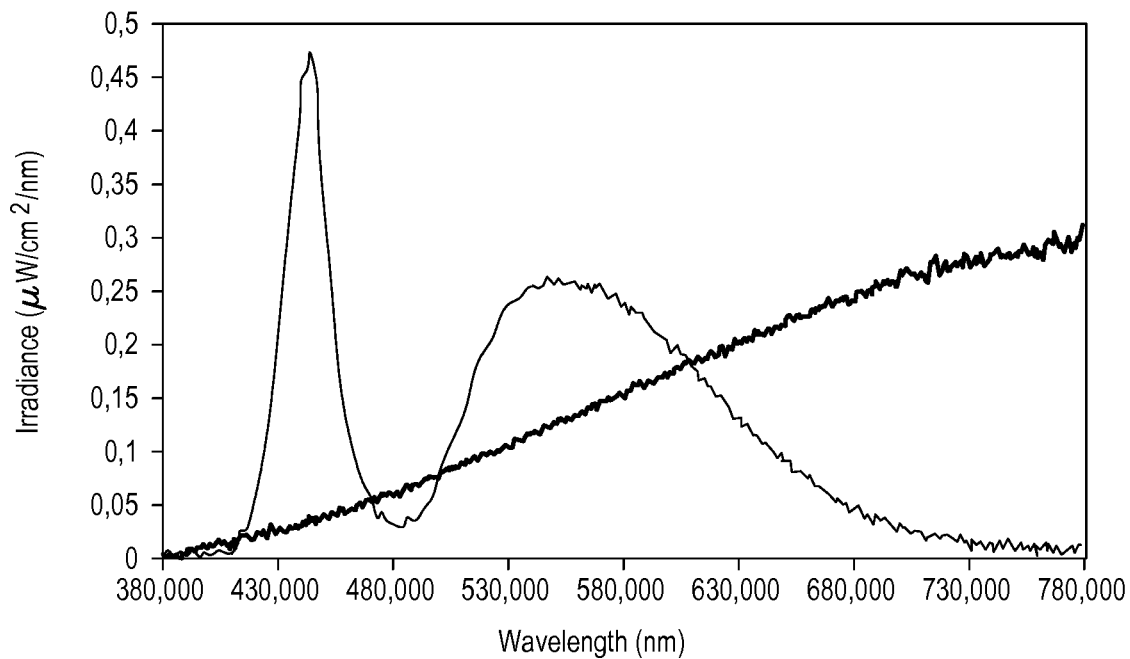
FIG. 1, already described, is a graph showing the compared irradiance of LED and halogen headlights.
Figure 2:
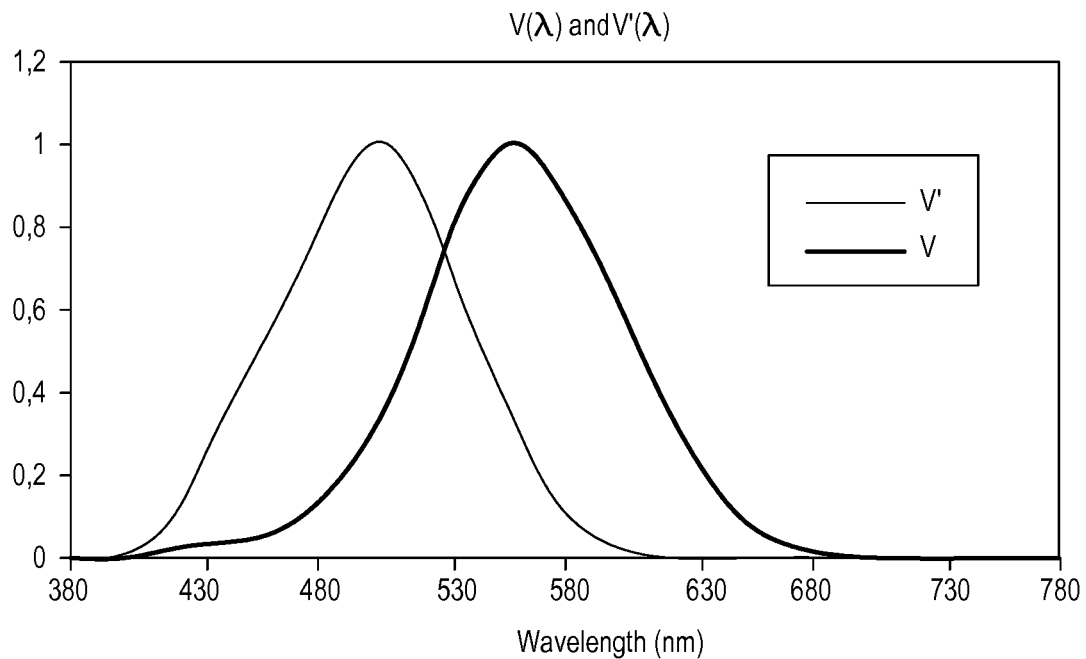
FIG. 2, already described, shows the spectral luminous efficiency of eye for photopic vision normalized in CIE 1931 "V(λ)" and the spectral luminous efficiency of eye for scotopic vision normalized in CIE 1951 "V'(λ)" according to the wavelength in the visible region i.e. from 380 nm to 780 nm.

In the description which follows, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about".

Also unless otherwise indicated, the indication of an interval of values "from X to Y" or "between X and Y", according to the present invention, means including the values of X and Y.

In the present application, when an ophthalmic lens comprises one or more coatings onto the surface thereof, the expression "to deposit a layer or a coating onto the lens" is intended to mean that a layer or a coating is deposited onto the external (exposed) surface of the outer coating of the lens, that is to say its coating that is the most distant from the substrate.

A coating that is said to be "on" a substrate or deposited "onto" a substrate is defined as a coating which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with the substrate.

As used herein, the rear (or the inner) face of the substrate is intended to mean the face which, when using the lens, is the nearest from the wearer's eye. It is generally a concave face. On the contrary, the front face of the substrate, is the face which, when using the lens, is the most distant from the wearer's eye. It is generally a convex face.

In addition, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the ophthalmic lens of the invention in the international colorimetric system CIE L*a*b* are calculated between 380 nm and 780 nm, taking the standard illuminant D65 and the observer into account (angle of 10°). The observer is a "standard observer" as defined in the international colorimetric system CIE L*a*b*.

Generally speaking, the interferential coating of the ophthalmic lens according to the invention, which will be called "the antireflective coating", may be deposited onto any substrate, and preferably onto organic lens substrates, for example a thermoplastic or thermosetting plastic material. Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings may be, without limitation, an impact-resistant primer layer, an abrasion-resistant coating and/or a scratch-resistant coating, a polarizing coating, a photochromic coating or a tinted coating. In the following, a substrate means either a bare substrate or such a coated substrate.

The ophthalmic lens according to the invention has a front face and a rear face.

So as to reject part of short wavelengths light, i.e. blue light coming for example from car LED headlights, an ophthalmic lens according to the invention lowers by at least 20% transmission of light emitted by a LED for wavelengths ranging from 380 nm to 500 nm.

In particular, in order to quantify the lowering of transmission of short wavelengths i.e. blue light coming for example from car LED headlights, a parameter called the light cut factor CutLED can be used. CutLED is defined as follows:

$$CutLED = 100 - \frac{\sum_{\lambda=380}^{500} (\text{lens } T\% \times \text{LED emission } \%)}{\sum_{\lambda=380}^{500} \text{LED emission } \%}$$

where $\Sigma$ is a discrete or continuous i.e. integral sum operator, $\lambda$ is the wavelength in nm, lens $T\%$ is the transmittance of the lens in % and LED emission % is the spectral distribution of a white light emitting diode in %, especially a white light emitting diode used in headlamps for cars, according to automotive standards and requirements. As the light cut factor is a weighted function of the light source, the exact type of light source is not relevant, as soon as the main emission peak of the light source is located in a range of wavelengths between 430 nm and 480 nm, in particular between 440 nm and 465 nm.

The ophthalmic lens according to the invention has a light cut factor CutLED of at least 20%, preferably at least 30%, more preferably at least 35%, for wavelengths ranging from 380 nm to 500 nm.

This can be achieved by light absorbing compounds i.e. tint. Thus, in a particular embodiment, the lens contains light absorbing dyes.

The light absorbing additive is preferably chosen from a colorant, such as a dye or a pigment, or mixtures thereof. Suitable examples of dyes, pigments and colorants are compounds belonging to the azo or rhodamine or cyanine or polymethine or merocyanine or fluorescein or pyrylium or porphyrin or phthalocyanine or perylene or coumarin or acridine or indolenin or indol-2-ylidene or benzanthrone or anthrapyrimidine or anthrapyridone or benzotriazole or benzophenone or anthraquinone or triazine or oxalanilide families; metal-complexes such as a rare-earth cryptates or chelates; aluminates, silicates and aluminosilicates.

Preferred light absorbing dyes are chosen in the Color Index, for instance in the Teratop® commercial range, especially Teratop® Red NFR, Teratop® Yellow NFG, Teratop® Blue NFB (Huntsman) or in the Macrolex® series, especially Macrolex Red H, Macrolex Yellow G, Macrolex Violet 3R (Lanxess).

Such light absorbing dyes may be located in the mass or bulk of the substrate of the lens or may be located in a thin layer of the mass of the substrate, or, as a variant, may be located in a coating or a laminate deposited on a substrate of the lens. Coatings may be any kind of wet coatings. For laminates, any process may be used, including the use of a coloured wafer of material placed in a mould prior to injection or casting of a lens, or the transfer of a laminate from a carrier onto a lens, or the deposition of a laminate onto a lens with an adhesive.

Therefore, a method for obtaining an ophthalmic lens according to the invention in which dyes are located in the mass or bulk of the substrate of the lens comprises a step of tinting the lens by mixing a light absorbing dye in a polymerizable composition, which yields the substrate upon polymerization.

Alternatively, a method for obtaining an ophthalmic lens according to the invention in which dyes are located in a thin layer of the mass of the substrate of the lens comprises a step of tinting the lens by applying a sublimation process or by applying an imbibition process.

In both methods, the substrate is provided then put in contact with dyes in such a way that dyes can diffuse inside the substrate. As a result, a thin layer of the substrate comprises dyes and the substrate is tinted.

In a sublimation process, dyes are deposited on the substrate by sublimation; then the substrate is kept in a warm environment for a determined time so that dyes can diffuse in the substrate; and finally the substrate is cleaned to remove excess dyes still deposited on the surface.

In an imbibition process, the substrate is immersed in a hot liquid bath comprising dyes; then left in the bath for a determined time so that dyes can diffuse in the substrate; and finally the substrate is extracted from the bath and cleaned to remove residual liquid.

Last, a method for obtaining an ophthalmic lens according to the invention in which dyes are located in a coating deposited on a substrate of the lens comprises a step of applying a wet coating, either by dip coating or spray coating or spin coating or any well know coating method. In this method, a coating composition comprising dyes is provided, applied on the substrate by dip, spray or any other suitable method, then cured by heat and/or actinic radiations, in particular UV rays.

Moreover, the front and rear faces of the ophthalmic lens have an antireflective coating which has a luminous reflectance in the visible region for scotopic vision Rv' lower than or equal to 1.5%, preferably lower than or equal to 1.0%, more preferably lower than or equal to 0.7%, even more preferably lower than or equal to 0.5%. Such values, although close to one another, correspond to significantly different perceptions, in particular significant lowering of unwanted reflections leading to ghost images or blurred images.

The antireflective coating may comprise a stack of a predetermined number of layers. For example, the number of layers may be lower than 10.

The antireflective coating deposited on the substrate comprises a stack of at least one high refractive index layer (HI) and at least one low refractive index layer (LI).

More preferably, it comprises at least two layers with a low refractive index (LI) and at least two layers with a high refractive index (HI). It is here a simple stack, since the layer total number in the antireflective coating is higher than or equal to 3, preferably higher than or equal to 4, and lower than or equal to 7, more preferably lower than or equal to 6, even more preferably lower than or equal to 5, and most preferably equal to 5 or 6 layers.

According to an embodiment, the antireflective coating according to the invention may comprise in the direction moving away from the substrate:

a high refractive index sheet comprising at least as material(s), $SiO_x$ with x<2, $TiO_2$ or $SiO_x+TiO_2$ (i.e. a sheet comprising two layers: a layer based of $SiO_x$ which is adjacent to a layer based of $TiO_2$); and having an overall thickness of about 5 to 30 nm;

one low refractive index layer (LI) having a physical thickness of from 30 to 50 nm;

one high refractive index layer (HI) having a physical thickness of from 80 to 120 nm;

optionally an electrically conductive layer with a thickness of from 3 to 10 nm; and one low refractive index layer (LI) having a physical thickness of from 68 to 88 nm.

In the present application, a layer of the antireflective coating is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. A layer of an antireflective coating is said to be a low refractive index layer (LI) when its refractive index is lower than 1.55, preferably lower than or equal to 1.50, more preferably lower than or equal to 1.48 and most preferably lower than or equal to 1.47.

Unless otherwise specified, the refractive indices referred to in the present application are expressed at 25° C. at a wavelength of 530 nm.

The HI layer is a traditional high refractive index layer that is well known in the art. It generally comprises one or more metal oxides such as, without limitation, zirconia ($ZrO_2$), titanium dioxide ($TiO_2$), alumina ($Al_2O_3$), silicon nitride ($Si_3N_4$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$), silicon oxide ($SiO_x$) with x<2.

Thus, the HI layers may further contain silica or other materials with a low refractive index, provided they have a refractive index higher than or equal to 1.55 as indicated above. The preferred materials include $TiO_2$, $PrTiO_3$, $ZrO_2$, $Al_2O_3$, $Si_3N_4$, $Y_2O_3$, silicon oxide ($SiO_x$) with x<2 and mixtures thereof.

In particular, the metal oxides are selected from zirconia ($ZrO_2$), titanium dioxide ($TiO_2$) or silicon oxide ($SiO_x$) with x<2.

The LI layer is also well known and may comprise, without limitation, $MgF_2$ or one or more metal oxides selected from: silica ($SiO_2$); or a mixture of silica and alumina, the latter contributing to increase the antireflective coating thermal resistance. The low refractive index layer (LI) is preferably a layer comprising at least 80% by weight of silica, more preferably at least 90% by weight of silica, relative to the layer total weight, and even more preferably consists in a silica $SiO_2$ layer.

Optionally, the LI layers may further contain materials with a high refractive index, provided the refractive index of the resulting layer is lower than 1.55.

In one embodiment of the present invention, the antireflective coating outer layer, which corresponds to the layer which is the farthest from the substrate, is a low refractive index layer. In particular, this outer layer is a silica-based layer, comprising preferably at least 80% by weight of silica, more preferably at least 90% by weight of silica (for example a silica layer doped with alumina), relative to the layer total weight, and even more preferably consists in a silica layer.

The charge dissipating conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm.

Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a particular embodiment, the electrically conductive and optically transparent layer is an indium-tin oxide layer, noted ITO layer or a tin oxide layer. Typically, an ITO layer is composed of about 10% in weight of tin oxide and about 90% in weight of indium oxide.

In one embodiment of the present invention, the antireflective coating is deposited onto a sub-layer. It should be noted that such an antireflective coating sub-layer does not belong to the antireflective coating.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating. The sub-layer has preferably a refractive index lower than or equal to 1.55.

The thickness of the sub-layer is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such a silica-based layer is generally lower than 300 nm, more preferably lower than 200 nm, and is generally higher than 90 nm, more preferably higher than 100 nm.

In another embodiment, this $SiO_2$-based layer preferably consists of a silica layer doped with alumina, in amounts such as defined above.

In a particular embodiment, the sub-layer consists of a $SiO_2$ layer.

The various layers of the antireflective coating are preferably deposited by vapor deposition, under vacuum, according to any of the following methods: i) by optionally ion-beam assisted, evaporation; ii) by ion-beam sputtering; iii) by cathode sputtering; iv) by plasma-assisted vapor deposition; v) by magnetron sputtering; vi) by electron beam assisted evaporation; vii) by thermal evaporation. These various methods are described in the following references "Thin Film Processes" and "Thin Film Processes II," Vossen & Kern, Ed., Academic Press, 1978 and 1991, respectively. A particularly recommended method is thermal or electron beam assisted evaporation under vacuum.

Prior to depositing the antireflective coating onto the substrate, the latter may be submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent). It may also be deposition of a thin adhesion layer.

The light cut factor CutLED is higher than or equal to 20%.

In a particular embodiment, the ophthalmic lens according to the invention has a transmission larger than or equal to 20% and lower than or equal to 50% at 450 nm. As LED light usually shows a maximum in emission spectrum about 450 nm, it is then highly interesting to have a rejection of light about this maximum, so as to limit glare and discomfort for the wearer.

In a particular embodiment, the ophthalmic lens according to the invention has a luminous transmittance in the visible region for scotopic vision Tv' higher than or equal to 80%. This is appropriate for night driving.

In a particular embodiment, the ophthalmic lens according to the invention has a luminous transmittance in the visible region for photopic vision Tv higher than or equal to 80%. This corresponds to a class 0 lens, which fulfills requirements for driving.

Optionally, light transmitted through the ophthalmic lens according to the invention has a colorimetric value b*, as defined in the colorimetric CIE L*a*b* with illuminant D65, lower than 20.

Hence, the present invention provides an ophthalmic lens having both light cut properties in a short wavelength light area and very low reflection on lens surfaces in the visible region under scotopic conditions. Such lenses are particularly suited for night vision conditions, especially night driving conditions.

All the features of the lens may apply to a lens without any correction, as well as to a lens corresponding to a specific prescription, which is advantageously adapted to night vision.

The following examples illustrate the present invention in a non-limiting manner.

EXAMPLES

1. General Procedures

The ophthalmic lenses used in the examples comprise a lens substrate CR39® having a refractive index of 1.50.

Light cut was mainly achieved through absorption. A tinting process through an imbibition or a sublimation method was applied. The tinting recipe was balanced to achieve the desired value of CutLED while maintaining sufficiently high transmittance Tv and a sufficiently neutral colour.

Imbibition Method:

In this section, the preparation of lenses L1 and L2 is explained.

A solution containing a mix of 3 primary dyes: TERATOP NFR+TERATOP NFG+TERATOP NFB is prepared in soft water with dispersant (Super NSI from Europizzi). The solution is heated at 94° C.

Lens substrates are soaked in the solution. The tinting time is depending on the desired grade. The darker is the desired grade, the longer will be the tinting time. The imbibition time is adapted to reach required value of Tv.

Then, lenses are withdrawn from the bath, laid on a tray, then placed in an oven for 1 hour at 100° C.±3° C.

Precise solutions (composition in weight %) used for lenses L1 and L2 are described in table 1 below.

TABLE 1

| Lens | NFB | NFG | NFR | Dispersant | Soft water |
|------|-----|-----|-----|------------|------------|
| L1 | 1.05% | 0.25% | 0.14% | 0.40% | qsp 100% |
| L2 | 0.80% | 0.33% | 0.39% | 0.40% | qsp 100% |

Sublimation Method:

In this section, the preparation of lenses L3 and L4 is explained.

Dyes are deposited by sublimation on lens substrates:
a mixture of three sublimable dyes (blue, yellow and red to yield a brown colour) is printed on a specific paper,
dyes are transferred from the specific paper to the concave side of the lens by sublimation,
the lens is finally heated so that dyes diffuse in the mass of the lens (imbibiting step).

This first step is described in details in patent applications EP1249334, EP1388607, EP1298483, EP1367412, EP1237035 and EP1122355.

For all lenses L1, L2, L3 and L4, a hard coat based on epoxysilane hydrolyzates, such as those described in the patents EP0614957, U.S. Pat. Nos. 4,211,823 and 5,015,523, was then applied on the front face and the rear face of the substrate.

An antireflective coating according to the present invention is deposited on the front face and on the rear face of lenses L1, L2, L3 and L4, as defined in table 2 below. Refractive indices are expressed at 25° C. at a wavelength of 550 nm.

TABLE 2

| Layer | Material | Refractive index at 550 nm | Thickness (nm) |
|-------|----------|---------------------------|----------------|
| Medium | Air | 1 | |
| 1 | SiO$_2$ | 1.47 | 72 |
| 2 | SnO$_2$ | 1.82 | 6.50 |
| 3 | ZrO$_2$ | 1.99 | 98 |
| 4 | SiO$_2$ | 1.47 | 43 |
| 5 | TiO$_2$ | 2.32 | 6.8 |
| 6 | SiO$_2$ | 1.47 | 150 |
| | Substrate + Hard coat | 1.48 | |

The layers of the antireflective coatings were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

Figure 6:
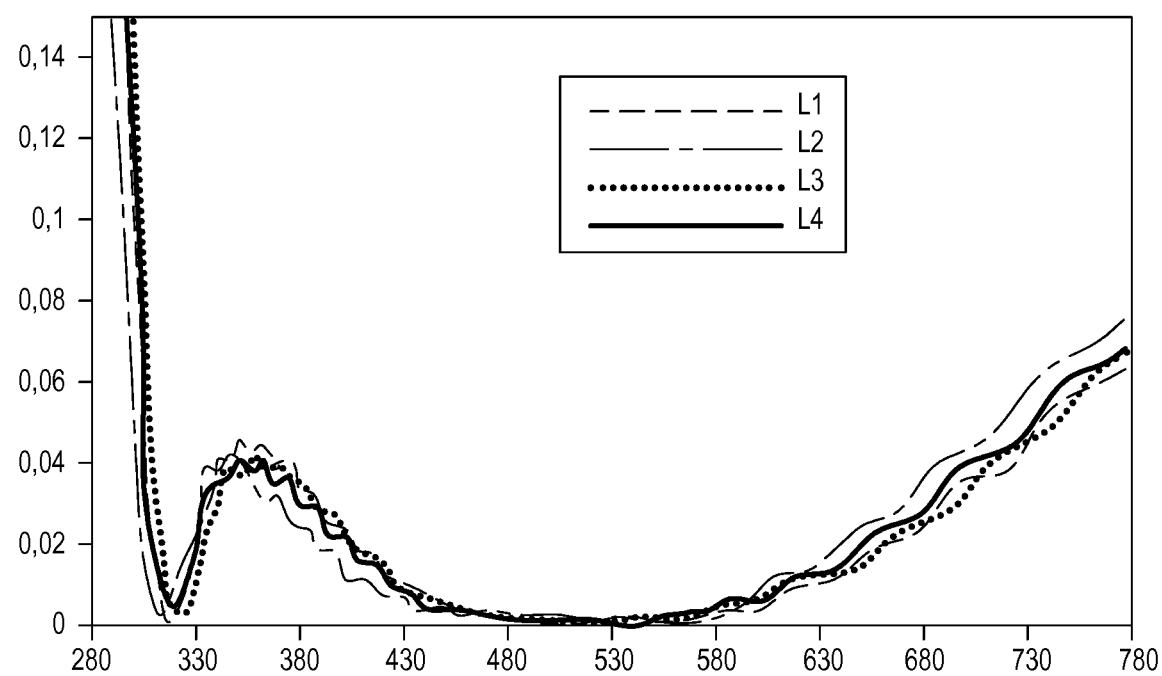
FIG. 6 is a graph showing the reflectance, in %, as a function of the wavelength, in nm, of the front face of lenses according to the invention.

The antireflective coating is optimized in order to eliminate reflections at the maximum sensitivity of the eye under scotopic conditions, i.e. at 510 nm, as shown in FIG. 6.

2. Measurement Methods

CutLED has been measured using the following LED emission % spectral distribution, corresponding to a LED 5500K (cold white) typically used for car headlamps.

| Wavelength (nm) | Spectral distribution |
| --- | --- |
| 380 | 0.001 |
| 385 | 0.002 |
| 390 | 0.002 |
| 395 | 0.002 |
| 400 | 0.004 |
| 405 | 0.008 |
| 410 | 0.021 |
| 415 | 0.053 |
| 420 | 0.129 |
| 425 | 0.28 |
| 430 | 0.501 |
| 435 | 0.768 |
| 440 | 0.969 |
| 445 | 0.956 |
| 450 | 0.68 |
| 455 | 0.375 |
| 460 | 0.216 |
| 465 | 0.139 |
| 470 | 0.092 |
| 475 | 0.066 |
| 480 | 0.055 |
| 485 | 0.055 |
| 490 | 0.07 |
| 495 | 0.101 |
| 500 | 0.152 |
| 505 | 0.218 |
| 510 | 0.288 |
| 515 | 0.352 |
| 520 | 0.404 |
| 525 | 0.443 |
| 530 | 0.472 |
| 535 | 0.491 |
| 540 | 0.498 |
| 545 | 0.502 |
| 550 | 0.503 |
| 555 | 0.502 |
| 560 | 0.497 |
| 565 | 0.489 |
| 570 | 0.481 |
| 575 | 0.467 |
| 580 | 0.456 |
| 585 | 0.441 |
| 590 | 0.425 |
| 595 | 0.405 |
| 600 | 0.383 |
| 605 | 0.36 |
| 610 | 0.334 |
| 615 | 0.31 |
| 620 | 0.285 |
| 625 | 0.261 |
| 630 | 0.237 |
| 635 | 0.214 |
| 640 | 0.195 |
| 645 | 0.174 |
| 650 | 0.156 |
| 655 | 0.139 |
| 660 | 0.123 |
| 665 | 0.109 |
| 670 | 0.096 |
| 675 | 0.086 |
| 680 | 0.075 |
| 685 | 0.066 |
| 690 | 0.058 |
| 695 | 0.051 |
| 700 | 0.044 |
| 705 | 0.039 |
| 710 | 0.034 |
| 715 | 0.03 |
| 720 | 0.026 |
| 725 | 0.023 |
| 730 | 0.02 |
| 735 | 0.018 |
| 740 | 0.015 |
| 745 | 0.013 |
| 750 | 0.012 |
| 755 | 0.01 |
| 760 | 0.009 |
| 765 | 0.008 |
| 770 | 0.007 |
| 775 | 0.006 |
| 780 | 0.005 |

3. Results

Several lenses dedicated to improve night vision and more specifically addressing the activity of night driving are known. However, most of them are unaesthetic as they are yellow, as a consequence of completely filtering wavelengths under 450 nm.

Considering that the eye, as explained above, is more sensitive to shorter wavelengths at night, the level of rejection of known lenses might impact visibility of objects or details.

Figure 3:
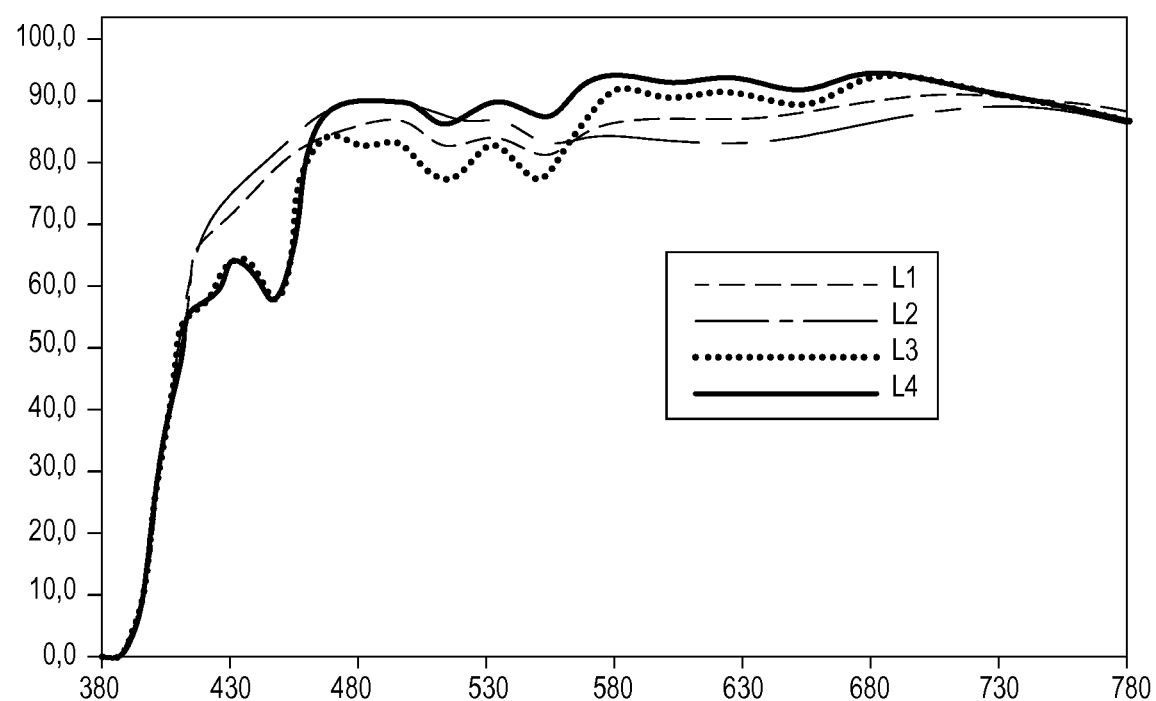
FIG. 3 is a set of graphs showing the transmittance, in %, as a function of the wavelength, in nm, of lenses according to the invention.

The graphs of FIG. 3 show the transmittance, in %, as a function of the wavelength, in nm, of lenses L3 and L4 according to the invention, for which CutLED is 35% and lenses L1 and L2 also according to the invention, for which CutLED is 21%.

For comparison purposes, the table below shows the transmittance under photopic conditions Tv, in %, the transmittance under scotopic conditions Tv', in %, the light cut factor CutLED, in %, the luminous reflectance in the visible region for scotopic vision Rv' for the front face of the lens (convex side), in %, and colorimetric parameters a* and b* of the CIE Lab model for light transmitted through the lens, for six types of ophthalmic lenses: KIROS®0-450 (from ESSILOR), lenses L1 to L4 and Clear ORMA®.

| Lens type | Tv, % | Tv', % | CutLED, % | Rv', % | a | b |
| --- | --- | --- | --- | --- | --- | --- |
| KIROS ®0-450 | 90 | 58 | 95 | | | |
| Lens L1 | 85 | 85 | 21 | 0.28 | −0.6 | 4 |
| Lens L2 | 85 | 86 | 21 | 0.26 | −3.7 | 3.6 |
| Lens L3 | 85 | 80 | 35 | 0.29 | 1 | 11.8 |
| Lens L4 | 90 | 85 | 35 | 0.27 | −3.7 | 14.5 |
| Clear ORMA ® | 99 | 99 | 3 | | | |

A sensory analysis was carried out under simulated night conditions, using real LED car headlights, for the following lens prototypes according to the invention: lenses L1 to L4 and, for comparison purposes, for a conventional clear lens, all the lenses having the same hard multi-coating.

Figure 4:
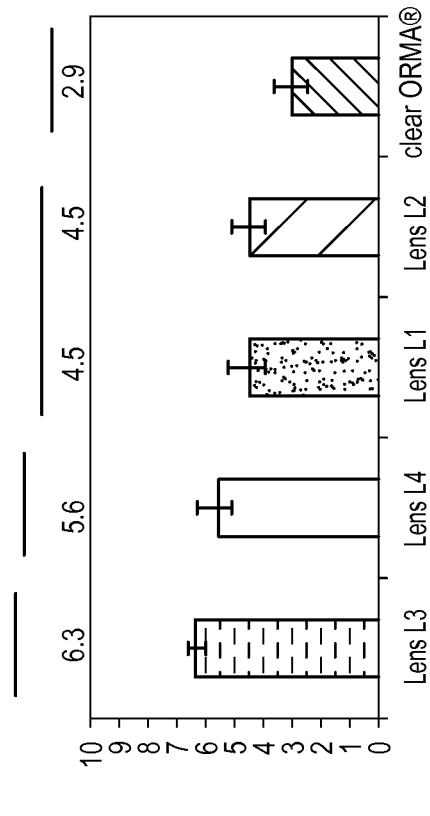
FIG. 4 is a graph showing the results of a sensory analysis for various lenses in a test situation where glare is caused by car front headlights.

Two glare situations were tested: glare from front headlights and glare from back headlights. The results, shown in FIG. 4, demonstrated that the ophthalmic filter lens L3 having a transmittance under photopic conditions Tv of 85%, a light cut factor CutLED of 35% and a rejection peak of 40% at 450 nm was more efficient in reducing headlight luminosity than a conventional clear lens for which Tv is 99% and CutLED is 3%. This highlights the benefit of this ophthalmic filter on glare reduction.

Indeed, on a scale of ten, where 0 is "very intense" and 10 "not intense", with a glare from front headlights, the ophthalmic filter lens L3 had 6.3, versus 2.9 for the clear lens. Values of 5.6, 4.5 and 4.5 were respectively obtained by lens L4, lens L1 and lens L2.

Figure 5:
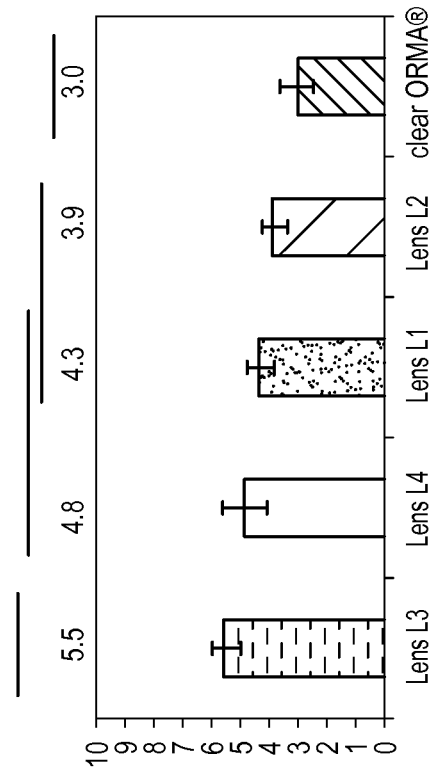
FIG. 5 is a graph showing the results of a sensory analysis for various lenses in a test situation where glare is caused by car back headlights.

As shown in FIG. 5, similar results were obtained with a glare from back headlights when comparing prototypes according to the invention with the conventional clear lens: the ophthalmic filter lens L3 had 5.5, versus 3.0 for the clear lens. Values of 4.8, 4.3 and 3.9 were respectively obtained by lens L4, lens L1 and lens L2. Overall glare reduction was evaluated as lower than in the situation where glare was caused by front headlights.

Although representative processes and articles have been described in detail herein, those skilled in the art will recognize that various substitutions and modifications may be made without departing from the scope of what is described and defined by the appended claims.

The invention claimed is:

1. An ophthalmic lens comprising:
a front face;
a rear face;
an antireflective coating on said front face;
an antireflective coating on said rear face;
the antireflective coating on said front face and the antireflective coating on said rear face each having a luminous reflectance in the visible region for scotopic vision Rv' lower than or equal to 1.5%,
wherein the antireflective coating on said front face and the antireflective coating on said rear face together lower transmission of light emitted by a light emitting diode by at least 20% for wavelengths ranging from 380 nm to 500 nm, the transmitted light having a main emission peak located in a range of wavelengths between 430 nm and 480 nm, and
wherein the ophthalmic lens has a light cut factor CutLED of at least 20% for wavelengths ranging from 380 nm to 500 nm, CutLED being defined by:

$$CutLED = 100 - \frac{\sum_{\lambda=380}^{500}(\text{lens } T\% \times \text{LED emission }\%)}{\sum_{\lambda=380}^{500} \text{LED emission }\%}$$

where $\Sigma$ is a discrete or continuous sum operator, $\lambda$ is the wavelength in nm, lens T % is the transmittance of said lens in % and LED emissions is the spectral distribution of the light emitting diode in % having the main emission peak located in a range of wavelengths between 430 nm and 480 nm.

2. The ophthalmic lens according to claim 1 in combination with the light emitting diode, wherein the light emitted by the light emitting diode corresponds to light emitted by a LED 5500K (cold white).

3. The ophthalmic lens according to claim 1, wherein the ophthalmic lens has a transmission larger than or equal to 20% and lower than or equal to 50% at a wavelength of 450 nm.

4. The ophthalmic lens according to claim 1, wherein the ophthalmic lens has a luminous transmittance in the visible region for scotopic vision Tv' higher than or equal to 80%.

5. The ophthalmic lens according to claim 1, wherein light transmitted through said ophthalmic lens has a colorimetric value b*, as defined in international colorimetric CIE L*a*b* with illuminant D65, lower than 20.

6. The ophthalmic lens according to claim 1, wherein the ophthalmic lens contains light absorbing dyes.

7. The ophthalmic lens according to claim 6, further comprising a substrate and wherein said light absorbing dyes are located in at least a layer of a mass of the substrate.

8. The ophthalmic lens according to claim 6, wherein said light absorbing dyes are located in a coating deposited on a substrate.

9. The ophthalmic lens according to claim 1, wherein said antireflective coating on said front and said rear faces comprises a stack of a predetermined number of layers.

10. The ophthalmic lens according to claim 1, wherein said antireflective coating on said front and rear faces has a luminous reflectance in the visible region for scotopic vision Rv' lower than or equal to 1.0%.

11. The ophthalmic lens according to claim 1, wherein said light cut factor CutLED is larger than or equal to 30%.

12. A method for obtaining an ophthalmic lens comprising:
a step of tinting said ophthalmic lens that has a front face and a rear face to obtain an antireflective coating on said front face, and
an antireflective coating on said rear face,
the antireflective coating on said front face and the antireflective coating on said rear face each having a luminous reflectance in the visible region for scotopic vision Rv' lower than or equal to 1.5%,
wherein the antireflective coating on said front face and the antireflective coating on said rear face together lower transmission of light emitted by a light emitting diode by at least 20% for wavelengths ranging from 380 nm to 500 nm, the transmitted light having a main emission peak located in a range of wavelengths between 430 nm and 480 nm, and
wherein the ophthalmic lens has a light cut factor CutLED of at least 20% for wavelengths ranging from 380 nm to 500 nm, CutLED being defined by:

$$CutLED = 100 - \frac{\sum_{\lambda=380}^{500}(\text{lens } T\% \times \text{LED emission}\%)}{\sum_{\lambda=380}^{500} LED \text{ emission}\%}$$

where $\Sigma$ is a discrete or continuous sum operator, $\lambda$ is the wavelength in nm, lens T % is the transmittance of said lens in % and LED emissions is the spectral distribution of the light emitting diode in % having the main emission peak located in a range of wavelengths between 430 nm and 480 nm,
wherein said tinting of the ophthalmic lens is done by applying a sublimation process or by applying a wet coating process or by applying an imbibition process or by mixing a light absorbing dye in a substrate composition.

13. The ophthalmic lens according to claim 1, wherein the ophthalmic lens has a transmission larger than or equal to 20% and lower than or equal to 50% at a wavelength of 450 nm.

14. The ophthalmic lens according to claim 1, wherein the ophthalmic lens has a luminous transmittance in the visible region for scotopic vision Tv' higher than or equal to 80%.

15. The method of claim 12, wherein said tinting of the ophthalmic lens is done by depositing light absorbing dye on a substrate of the ophthalmic lens in the sublimation process.

16. The method of claim 12, wherein said tinting of the ophthalmic lens is done by the wet coating process depositing light absorbing dye on a substrate of the ophthalmic lens.

17. The method of claim 12, wherein said tinting of the ophthalmic lens is done by the imbibition process diffusing a light absorbing dye into a substrate of the ophthalmic lens.

18. The method of claim 12, wherein said tinting of the ophthalmic lens is done by mixing a light absorbing dye in a substrate composition which yields a substrate upon polymerization and said light absorbing dye is located in at least a layer of a mass of the substrate of the ophthalmic lens.

19. An ophthalmic lens in combination with a light emitting automotive LED that emits light with a main emission peak located in a range of wavelengths between 430 nm and 480 nm, the ophthalmic lens comprising:
   a front face;
   a rear face;
   an antireflective coating on said front face;
   an antireflective coating on said rear face;
   the antireflective coating on said front face and the antireflective coating on said rear face each having a luminous reflectance in the visible region for scotopic vision Rv' lower than or equal to 1.5%,
   wherein the antireflective coating on said front face and the antireflective coating on said rear face together lower transmission of light emitted by a light emitting diode by at least 20% for wavelengths ranging from 380 nm to 500 nm, and
   wherein the ophthalmic lens has a light cut factor CutLED of at least 20% for wavelengths ranging from 380 nm to 500 nm, CutLED being defined by:

$$CutLED = 100 - \frac{\sum_{\lambda=380}^{500}(\text{lens } T\% \times LED \text{ emission}\%)}{\sum_{\lambda=380}^{500} LED \text{ emission}\%}$$

where $\Sigma$ is a discrete or continuous sum operator, $\lambda$ is the wavelength in nm, lens T % is the transmittance of said lens in % and LED emissions is the spectral distribution of the light emitting diode in % having a main emission peak located in a range of wavelengths between 430 nm and 480 nm.

20. The ophthalmic lens in combination with the light emitting automotive LED according to claim 19, wherein the light emitting automotive LED is a LED 5500K (cold white).

* * * * *